United States Patent
Larsen

(10) Patent No.: US 11,901,922 B2
(45) Date of Patent: Feb. 13, 2024

(54) RADIO-FREQUENCY TRANSMITTER

(71) Applicant: Honeywell International Inc., Charlotte, NC (US)

(72) Inventor: David Larsen, Snohomish, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/448,154

(22) Filed: Sep. 20, 2021

(65) Prior Publication Data
US 2023/0089625 A1 Mar. 23, 2023

(51) Int. Cl.
*H04B 1/04* (2006.01)
(52) U.S. Cl.
CPC ..................... *H04B 1/04* (2013.01)
(58) Field of Classification Search
CPC .......... G01S 7/282; G01S 13/78; G01S 13/93; H04B 1/00; H04B 1/04; H04B 1/10; H04B 1/16; H04B 1/44; H04B 1/50; H04L 5/14; H04L 7/00; H04L 25/03; H04L 27/00; H04L 27/36
USPC ....... 375/146, 219, 295–297, 316, 346, 355; 455/59, 75, 114.1–114.3, 130, 255, 323, 455/334
See application file for complete search history.

(56) References Cited

U.S. PATENT DOCUMENTS

| 7,688,243 | B2 | 3/2010 | Hunter et al. |
| 8,502,720 | B1* | 8/2013 | Wyville ............... H03M 1/0629 341/149 |
| 11,038,728 | B1 | 6/2021 | Hastings |
| 2005/0156777 | A1 | 7/2005 | King et al. |
| 2008/0238759 | A1 | 10/2008 | Carocari et al. |
| 2013/0015998 | A1 | 1/2013 | Jones et al. |
| 2016/0013923 | A1* | 1/2016 | Malaga ............ H04L 5/14 370/277 |
| 2017/0358227 | A1 | 12/2017 | Troxel |
| 2020/0225316 | A1* | 7/2020 | Larsen ............ G01S 7/282 |
| 2020/0389193 | A1 | 12/2020 | Brandao |
| 2021/0036420 | A1 | 2/2021 | Ferguson et al. |

FOREIGN PATENT DOCUMENTS

| CN | 107966699 A | 4/2018 |
| EP | 2026466 A1 | 2/2009 |

OTHER PUBLICATIONS

U.S. Appl. No. 17/061,426, filed Oct. 1, 2020, naming inventors Hastings et al.

(Continued)

*Primary Examiner* — Shawkat M Ali
(74) *Attorney, Agent, or Firm* — Shumaker & Sieffert, P.A.

(57) ABSTRACT

In some examples, a system includes a digital-to-analog converter (DAC) configured to operate at a clock rate; a mixer configured to up-convert an intermediate-frequency (IF) signal from the DAC to a radio-frequency (RF) signal based on a local oscillator (LO) signal; and an RF filter configured to generate a filtered signal by at least removing, from the RF signal, frequency components greater than a difference between a frequency of the LO signal and one-half of the clock rate and less than a sum of a frequency of the LO signal and one-half of the clock rate, wherein an output node of the RF filter is configured to be coupled to an antenna for transmission of the filtered signal.

19 Claims, 7 Drawing Sheets

(56) References Cited

OTHER PUBLICATIONS

U.S. Appl. No. 17/213,048, filed Mar. 25, 2021, naming inventor Hastings.
U.S. Appl. No. 16/850,343, filed Apr. 16, 2020, naming inventor Brandao.
Extended Search Report from counterpart European Application No. 22193157.9 dated Jan. 23, 2023, 8 pp.
Response to Extended Search Report dated Jan. 23, 2023, from counterpart European Application No. 22193157.9 filed Feb. 27, 2023, 27 pp.

\* cited by examiner

RADIO-FREQUENCY TRANSMITTER

TECHNICAL FIELD

This disclosure relates to surveillance communication for vehicles.

BACKGROUND

A vehicle may use multiple different communication protocols for surveillance messages. Each communication protocol may operate in an assigned frequency band. For example, a transmitter for traffic collision avoidance system can encode interrogation messages at 1030 megahertz, while a transmitter for air traffic control transponder can encode reply messages at 1030 megahertz. A transmitter for distance measuring equipment can encode messages throughout a band extending from 1025 megahertz to 1150 megahertz.

SUMMARY

In general, this disclosure relates to the encoding of surveillance messages and the transmission of the encoded messages. Processing circuitry may be configured to encode a surveillance message in a digital signal that is converted by a digital-to-analog converter (DAC) to an analog signal based on a clock rate. The analog signal may encode the message in a first frequency band and in higher-frequency images of the first frequency band. A mixer may be configured to up-convert the analog signal to a radio-frequency (RF) signal for transmission. An intermediate-frequency filter and/or an RF filter may be configured to remove the frequency components in a lowest Nyquist region, while passing the frequency components in a higher Nyquist region.

In one example, a system includes a digital-to-analog converter (DAC) configured to operate at a clock rate; a mixer configured to up-convert an intermediate-frequency (IF) signal from the DAC to a radio-frequency (RF) signal based on a local oscillator (LO) signal; and an RF filter configured to generate a filtered signal by at least removing, from the RF signal, frequency components greater than a difference between a frequency of the LO signal and one-half of the clock rate and less than a sum of a frequency of the LO signal and one-half of the clock rate, wherein an output node of the RF filter is configured to be coupled to an antenna for transmission of the filtered signal.

In another example, a method includes converting, by a digital-to-analog converter (DAC) based on a clock rate, a digital signal to an analog signal; up-converting, by a mixer based on a local oscillator (LO) signal, an intermediate-frequency (IF) signal from the DAC to a radio-frequency (RF) signal; filtering the RF signal by at least removing, from the RF signal, frequency components greater than a difference between a frequency of the LO signal and one-half of the clock rate and less than a sum of a frequency of the LO signal and one-half of the clock rate; and transmitting the filtered RF signal.

In another example, a system includes a field-programmable gate array (FPGA) configured to encode a surveillance message in a digital signal; a digital-to-analog converter (DAC) configured to convert the digital signal to an analog signal based on a clock rate; a bandpass filter configured to remove, from the analog signal, frequencies less than one-half of the clock rate to generate an intermediate-frequency (IF) signal; a fixed-frequency local oscillator (LO) circuit configured to generate an LO signal; a mixer configured to up-convert the IF signal to a radio-frequency (RF) signal based on the LO signal; and a RF filter configured to generate a filtered signal by at least removing, from the RF signal, frequency components greater than a difference between a frequency of the LO signal and one-half of the clock rate and less than a sum of a frequency of the LO signal and one-half of the clock rate.

The details of one or more examples of the disclosure are set forth in the accompanying drawings and the description below. Other features, objects, and advantages will be apparent from the description, drawings, and claims.

DETAILED DESCRIPTION

Figure 1:
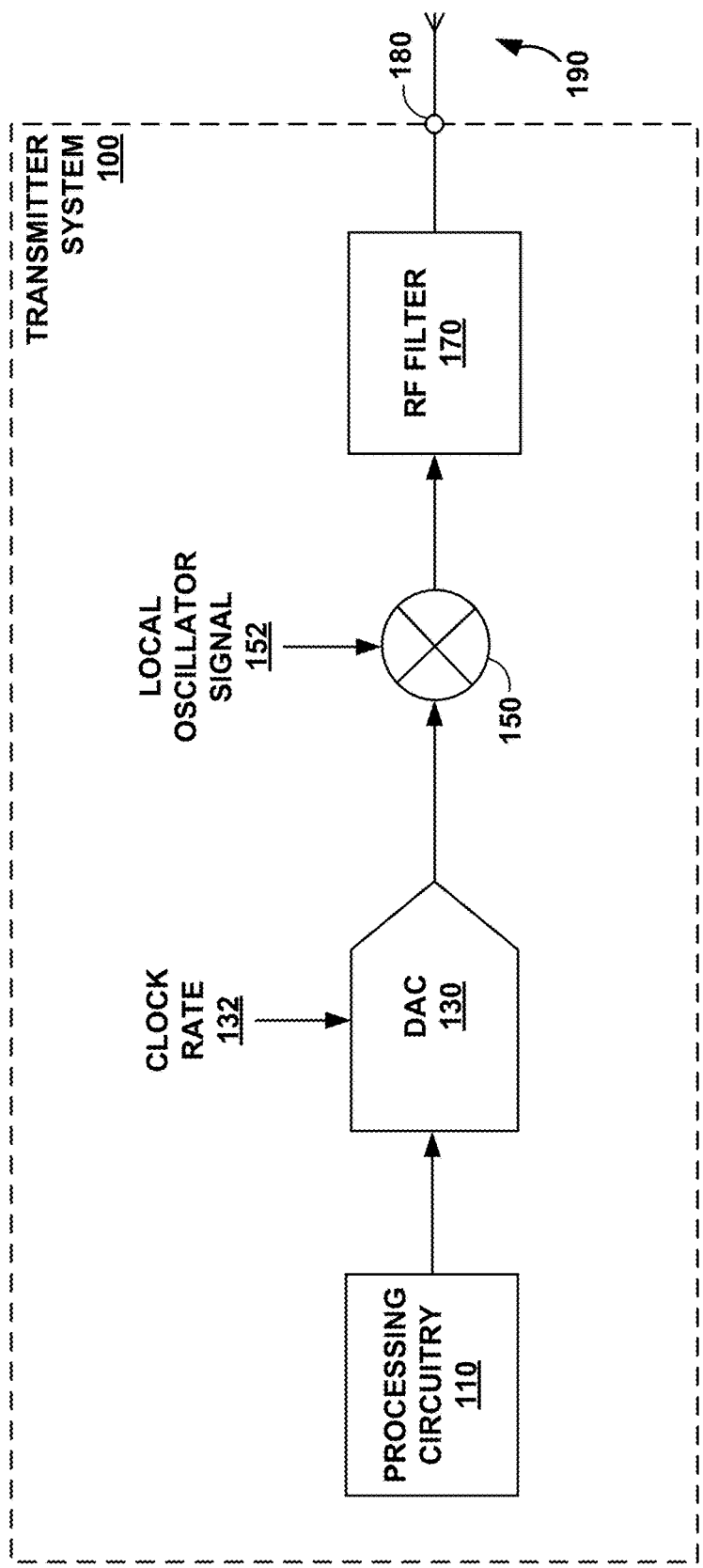
FIG. 1 is a conceptual block diagram of a transmitter system including a digital-to-analog converter (DAC) and a radio-frequency (RF) filter, in accordance with some examples of this disclosure.

Various examples are described below for generating and transmitting messages in a radio frequency (RF) band. A system may include processing circuitry for encoding messages in digital signals. The system may also include a digital-to-analog converter (DAC) for converting the digital signals to analog signals based on a clock rate. The processing circuitry may be configured to encode the messages in the lowest Nyquist region of the digital signals, where the lowest Nyquist region includes frequencies less than one-half of the clock rate. The analog signals outputted by the DAC may encode the messages at frequencies within the lowest Nyquist region, and the analog signals may also include an image of the messages in a second Nyquist region bounded by one-half of the clock rate and the clock rate. The analog signals may also include images at higher Nyquist regions.

In some examples, the system includes a filter (e.g., a bandpass filter) to remove frequencies in the lowest Nyquist region. The system may include filters in the intermediate-frequency (IF) domain and/or the RE domain. A mixer can up-convert the filtered or unfiltered analog signals, referred to as IF signals, to RF signals. The mixer may be configured to perform the up-conversion based on a local oscillator (LO) signal. The system may include an RF filter for filtering out frequencies that are within one-half of the DAC clock rate of a frequency of the LO signal (e.g., in the lowest Nyquist regions).

The frequency of the LO signal may leak into the RE signals that are generated by the mixer and filtered by the RE filter. If the lowest Nyquist region is used to encode the messages for transmission, the gap between the frequency of the leaked LO signal and the frequencies of the RF signals may be relatively small. For example, this gap may be on the order of tens of megahertz. An RF filter than can reject the leaked LO signal and pass the RF signals for a gap of fifty megahertz may be more expensive and complex than an RF filter that is designed for a gap of two hundred megahertz. For this reason, designing a system to pass frequencies in a higher Nyquist region while rejecting frequencies in the lowest Nyquist region may result in better performance and a less expensive bill of materials.

To drive down the cost, weight, and size of avionics, many surveillance system that were traditionally federated or separate systems are being integrated into single units. For example, a device of this disclosure may include a transmitter configured to send distance measuring equipment messages (DME) and transponder messages. The techniques of this disclosure may allow the use of a single fixed-frequency LO synthesizer and relatively low-cost filters for an integrated DME and transponder system. In addition, these techniques can reduce software complexity by only requiring the LO synthesizer to be programed once, rather than for each transition between every transmission type (e.g., switching between interrogation and reply messages).

A device of this disclosure may be configured to encode messages in a variable high IF to change the output frequency of the transmitter. In contrast, other integrated L-Band avionics transmitters may encode at a lower variable IF (e.g., below 150 megahertz) with a fixed LO, or at a high fixed IF (e.g., above 150 megahertz) with a variable LO. These transmitters may work well but include either complex filtering or complex software to reprogram the synthesizer during transitions between transmission types. Complex filtering and complex software can increase the cost of the system. Another potential approach is to modulate the RF frequency directly through analog modulators, but this approach may not be flexible. However, the techniques of this disclosure may provide flexibility for a wide variety of pulse types without complex filtering or software, thereby improving both cost and performance.

The techniques of this disclosure can take advantage of using higher Nyquist zones of the IF DAC to generate the highest feasible IF frequencies. A DAC such as the AD9783 made by Analog Devices of Norwood, Massachusetts can provide adequate performance in the second and third Nyquist zones. Using the DAC to generate the IF in the higher Nyquist zones (e.g., the second and third) may allow for a lower data clock rate between the processing circuitry and the DAC, saving cost and power, at a tradeoff of effective bits and output power of the DAC. Choosing a DAC with a higher resolution can overcome the loss of effective bits, and increasing the gain of the transmitter chain can overcome the lower output power. A bandpass filter in the IF domain may be configured to filter out the Nyquist zone of choice. An upconverter (e.g., mixer) may be configured to multiply the filtered IF signal by the LO signal. A controller may be configured to select an RF filter from a bank of RF filters in order to filter the desired RF frequency. Alternatively, the system may include a wide-band RF filter having a passband that covers all the desired transmit signal frequencies to reject unwanted products from the upconverter.

In some examples, the DAC can run in 'mix mode,' which inverts the output every other half clock cycle and provides adequate resolution and power in the second Nyquist zone. Processing circuitry may be configured to encode the data in a range from thirty to 155 megahertz, depending on what output frequency is desired. For a clock rate of 380 megahertz, the second Nyquist region of the encoding signals spans from 225 megahertz to 350 megahertz. At the output of the DAC, a bandpass filter may be configured to attenuate the first and third Nyquist regions. The bandpass filter may have a passband that includes 225 megahertz to 350 megahertz. The up-converter then mixes the filtered signals with a local oscillator signal (e.g., at eight hundred megahertz), resulting in, among other products, RF signals ranging from 1025 megahertz to 1150 megahertz. An RF filter connected to the output of the mixer can be relatively simple because the desired signals are at 1025 megahertz to 1150 megahertz, the LO leakage is down at eight hundred megahertz, and the low-side RF signals are at 450 megahertz to 575 megahertz. The RF filter may be arranged as a bank of surface acoustic wave (SAW) filters that together span from 1025 megahertz to 1150 megahertz in small increments with a switch to select the appropriate SAW filter in the bank.

FIG. 1 is a conceptual block diagram of a transmitter system 100 including a digital-to-analog converter (DAC) 130 and a radio-frequency (RF) filter 150, in accordance with some examples of this disclosure. In the example shown in FIG. 1, transmitter system 100 includes processing circuitry 110, DAC 130, mixer 150, RF filter 170, and output node 180. Transmitter system 100 may include other components in some examples, including antenna 190, which may be part of or external to system 100, as well as any of the components shown in FIG. 2.

As shown in FIG. 1, DAC 130 may be coupled to an output of processing circuitry 110. Processing circuitry 110 may also be coupled to a receiver so that processing circuitry 110 can detect when an interrogation message is received. A first input of mixer 150 may be coupled to DAC 130, a second input of mixer 150 may be coupled to a source of LO signal 152, and an output of mixer 150 may be coupled to RF filter 170. RF filter 170 may be coupled between mixer 150 and output node 180 or between mixer 150 and antenna 190.

Processing circuitry 110 may be configured to generate messages such as interrogation messages and/or broadcast messages on a regular basis. For example, processing circuitry 110 can encode the data of an interrogation message in a digital signal and deliver the digital signal to DAC 130. An interrogation message may cause another system (e.g., in another vehicle) to generate a reply message with data about the other system (e.g., the location of the other vehicle). In response to determining that an interrogation message has been received from another system, processing circuitry 110 may be configured to generate and encode a reply message in a digital signal. Processing circuitry 110 can deliver the digital signal to DAC 130. There may be predefined time window for generating and transmitting a reply message after receiving an interrogation message. Processing circuitry 110 can encode each message in a respective frequency band that may be in a lowest Nyquist region (e.g., less than one-half of clock rate 132).

DAC 130 may be configured to convert digital signals received from processing circuitry 110 to analog signals based on clock rate 132. The frequency of clock rate 132 may less than seven hundred megahertz, less than six hundred megahertz, less than five hundred megahertz, or less than four hundred megahertz. The frequency of clock rate 132 may be at least twice the frequency at which processing circuitry 110 encodes messages such that the encoding frequency is in the lowest Nyquist region.

The messages may be encoded in the analog signals generated by DAC 130 at multiple frequencies. For example, processing circuitry 110 may encode the messages in a frequency band within the lowest Nyquist region, where each Nyquist region is defined by multiples of one-half of clock rate 132. The analog signals may also include images in higher Nyquist regions, where each image also encodes the data of the surveillance messages. In a hypothetical example in which clock rate 132 is one hundred megahertz and processing circuitry 110 encodes a message at thirty megahertz, DAC 130 may generate an analog signal with images that encode the message at seventy megahertz, 130 megahertz, 170 megahertz, and so on. Each Nyquist region in this hypothetical example has a width of fifty megahertz.

Mixer 150 may be configured to up-convert analog signals based on LO signal 152. The frequency of LO signal 152 may be in a range between seven hundred megahertz and nine hundred megahertz or in a range between twelve hundred megahertz and fourteen hundred megahertz. The frequency of LO signal 152 may be in a range between 750 megahertz and 850 megahertz or in a range between 780 megahertz and 840 megahertz. One example frequency for LO signal 152 is eight hundred megahertz.

In accordance with the techniques of this disclosure, RE filter 170 may be configured to remove frequencies in the lowest Nyquist region, while passing frequencies in a higher Nyquist region. The two symmetrical lowest Nyquist regions of the RF signals may extend from one-half of clock rate 132 below LO signal 152 to one-half of clock rate 132 above LO signal 152. In other words, RE filter 170 may be configured to remove frequency components from the RF signals generated by mixer 150 that are greater than the frequency of LO signal 152 minus one-half of clock rate 132 and less than the frequency of LO signal 152 plus one-half of clock rate 132. "Remove" as used herein may not mean completely removing the frequency components, but instead may mean removing a substantial portion and/or partially suppressing these frequency components while allowing other frequency components to pass. The "removed" frequency components may have a power reduction of greater than five decibels, greater than ten decibels, greater than twenty decibels, or greater than thirty decibels.

In contrast to system 100 using images in higher Nyquist regions to encode messages, another hypothetical system may use a higher speed DAC to create a larger frequency gap between the LO frequency and the RF frequency. In this hypothetical system, the data of the surveillance message may be encoded at relatively high frequencies in the lowest Nyquist region (e.g., frequencies greater than one hundred megahertz). Thus, the LO frequency could be filtered out of the RF signals without a highly complex filter, but the higher speed DAC would increase the bill of materials for the system. The techniques of this disclosure may allow for the use of a lower-speed DAC, which may be less expensive than higher-speed DACs.

Figure 2:
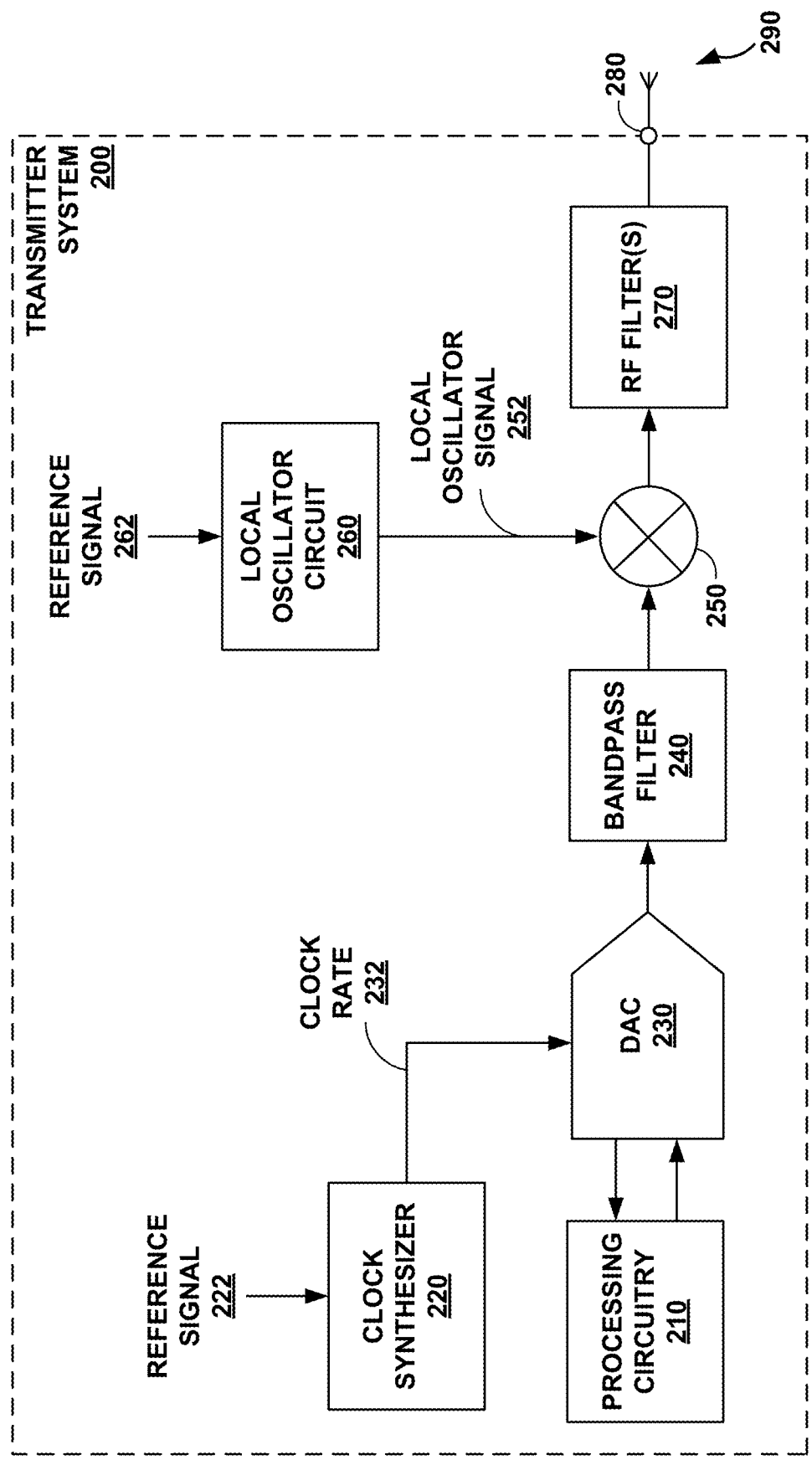
FIG. 2 is a conceptual block diagram of a transmitter system including a DAC, a bandpass filter, and an RF filter, in accordance with some examples of this disclosure.

FIG. 2 is a conceptual block diagram of a transmitter system including a DAC 230, a bandpass filter 240, and an RF filter 270, in accordance with some examples of this disclosure. In the example shown in FIG. 2, transmitter system 200 also includes processing circuitry 210, clock synthesizer 220, mixer 250, LO circuit 260, and output node 280. Transmitter system 200 may include other components such as antenna 290, which is shown outside of system 200 but may be integrated into system 200 in some examples.

As shown in FIG. 2, DAC 230 may be coupled to an output of processing circuitry 210 and/or to an output of clock synthesizer 220. Bandpass filter 240 may be coupled between an output of DAC 230 and an input of mixer 250. Another input of mixer 250 may be coupled to LO circuit 260, and an output of mixer 250 may be coupled to RF filter 270. RF filter 270 may be coupled between mixer 250 and output node 280 or between mixer 250 and antenna 290.

Processing circuitry 210 may be configured to encode surveillance messages in a lowest Nyquist region that includes frequencies less than one-half of clock rate 232. DAC 230 may be configured to boost the power of analog signals generated by DAC 230 in the second Nyquist region between one-half of clock rate 232 and clock rate 232, for example, by using mixed mode operation. In other words, for a clock rate of four hundred megahertz, DAC 230 may be configured to boost the power of IF signals outputted by DAC 230 between two hundred megahertz and four hundred megahertz.

Clock synthesizer 220 may be configured to generate clock rate 232 based on reference signal 222. Clock synthesizer 220 may include a clock generator circuit, a phase-locked loop, and/or a frequency synthesizer. The frequency of reference signal 222 may be approximately one hundred megahertz. In some examples, the same signal may be used for reference signals 222 and 262.

DAC 230 may be configured to operate based on clock rate 232, and DAC 230 may be configured to send clock rate 232 to processing circuitry 210 to allow for coordination between processing circuitry 210 and DAC 230. Processing circuitry 210 may be configured to receive clock rate 232 from clock synthesizer 220 and/or from DAC 230. Processing circuitry 210 may be configured to operate based on clock rate 232 by, for example, encoding a surveillance message in a digital signal based on clock rate 232. Processing circuitry 210 may be configured to use Equation (1) to determine the frequency at which to encode a surveillance message in a digital signal, where $f_{DIG}$ represents the encoding frequency, $f_{LO}$ represents the frequency of LO signal 252, $f_{CLK}$ represents clock rate 232, and $f_{RF}$ represents the transmission frequency.

$$f_{DIG} = f_{LO} + f_{CLK} - f_{RF} \quad (1)$$

Bandpass filter 240 may be configured to remove frequencies less than one-half of clock rate 232 from analog signals received from DAC 230. For example, bandpass filter 240 may have a cutoff frequency approximately equal to one-half of clock rate 232. Bandpass filter 240 may be configured to remove substantially all of the power at frequencies less than one-half of clock rate 232. Stated another way, bandpass filter 240 may be configured to remove frequency components in the lowest Nyquist region from the analog signal generated by DAC 230. Bandpass filter 240 may be configured to remove spurious frequency components of the analog signal generated by DAC 230.

Mixer 250 may be configured to up-convert the filtered IF signals received from bandpass filter 240. In examples in which LO circuit 260 includes a single fixed-frequency LO circuit, LO circuit 260 may be able to produce LO signal 252 as a constant LO The constant LO signal can be used for all of the operating modes (e.g., interrogation, reply, etc.) because the gap between the RF signals and the frequency of LO signal 252 is wide enough to allow for relatively inexpensive filters to remove the portion of LO signal 252 that leaks into the RF signals.

LO circuit 260 may include a single fixed-frequency LO circuit configured to generate LO signal 252 as a fixed-frequency LO signal. In contrast to using a fixed-frequency LO circuit, another system may include a variable LO circuit for switching between transmission frequencies. The variable LO circuit may allow for the system to maintain a wide gap between the LO frequency and the RF signals being generated. As an example, a hypothetical system may have two transmission frequencies: 1050 MHz and 1200 MHz. The hypothetical system may generate IF signals at 200 MHz and use an LO frequency of 1000 MHz, to generate RF signals at 1200 MHz. When the system transitions to generating RF signals at 1050 MHz, this hypothetical system may switch the LO frequency to 850 MHz. If the system were to instead use a single LO circuit fixed at 1000 MHz, the system would have a more complex and expensive filter for rejecting 1000 MHz and passing 1050 (e.g., a gap of only fifty megahertz). Thus, by using a variable LO, this hypothetical system can use a less complex and less expensive RF filter.

The variable LO allows for switching between transmission frequencies while maintaining a wide gap between the LO frequency and the RF signals. If the system receives an interrogation while the LO circuit is tuned to another frequency, the system will generate a reply to the interrogation by rescuing the variable LO circuit. The variable LO circuit will experience a wait time after being reset before the LO signal settles at the new frequency. This wait time may last more than ten microseconds, which is much longer than typical reply time of three to five microseconds for surveillance applications. Thus, variable LOs restrict the flexibility of a transmitter system. Additional example details of tunable local oscillators are described in commonly assigned U.S. Pat. No. 7,688,243, entitled "Method and System for Receiving Distance Measurement Equipment Channels in an Under-sampled Broadband Receiver," issued on Mar. 30, 2010, the entire contents of which are incorporated herein by reference.

An alternative configuration may include multiple fixed-frequency LO circuits with a fast switch for toggling between the LO circuits. A first LO circuit can be used for various operations, while a second LO circuit can be used for generating reply messages. In examples in which the system receives an interrogation while in a first operating mode, the system can toggle the switch to the second LO circuit for generating the reply message. By toggling to the appropriate LO circuit for each operating mode, the system may maintain a sizable gap between the LO frequency and the RF signals. The bill of materials for this hypothetical system may be higher than the bill of materials for transmitter system 200 because of the additional LO circuitry and the switch for toggling among the LO circuits. For at least these reasons, techniques of this disclosure may be simpler and less expensive than using a variable-frequency LO or multiple fixed-frequency LOs.

Antenna 290 may include one or more patch antennas integrated onto a circuit board, top-hat antennas, phased-array antennas, and/or any other type of antenna elements. Additional example details of antennas in a surveillance system are described in commonly assigned U.S. Pat. No. 11,038,728, entitled "Demodulating Surveillance Signals," issued on Jun. 15, 2021; U.S. patent application Ser. No. 16/892,029, entitled "Interference Limiting for Surveillance Messages," filed on Jun. 3, 2020; U.S. patent application Ser. No. 16/850,343, entitled "Simplified TCAS Surveillance," filed on Apr. 16, 2020; and U.S. patent application Ser. No. 16/568,708, entitled "Multi-Element Antenna Array with Integral Comparison Circuit for Phase and Amplitude Calibration," filed on Sep. 12, 2019, the entire contents of each of which are incorporated herein by reference.

Figure 3:
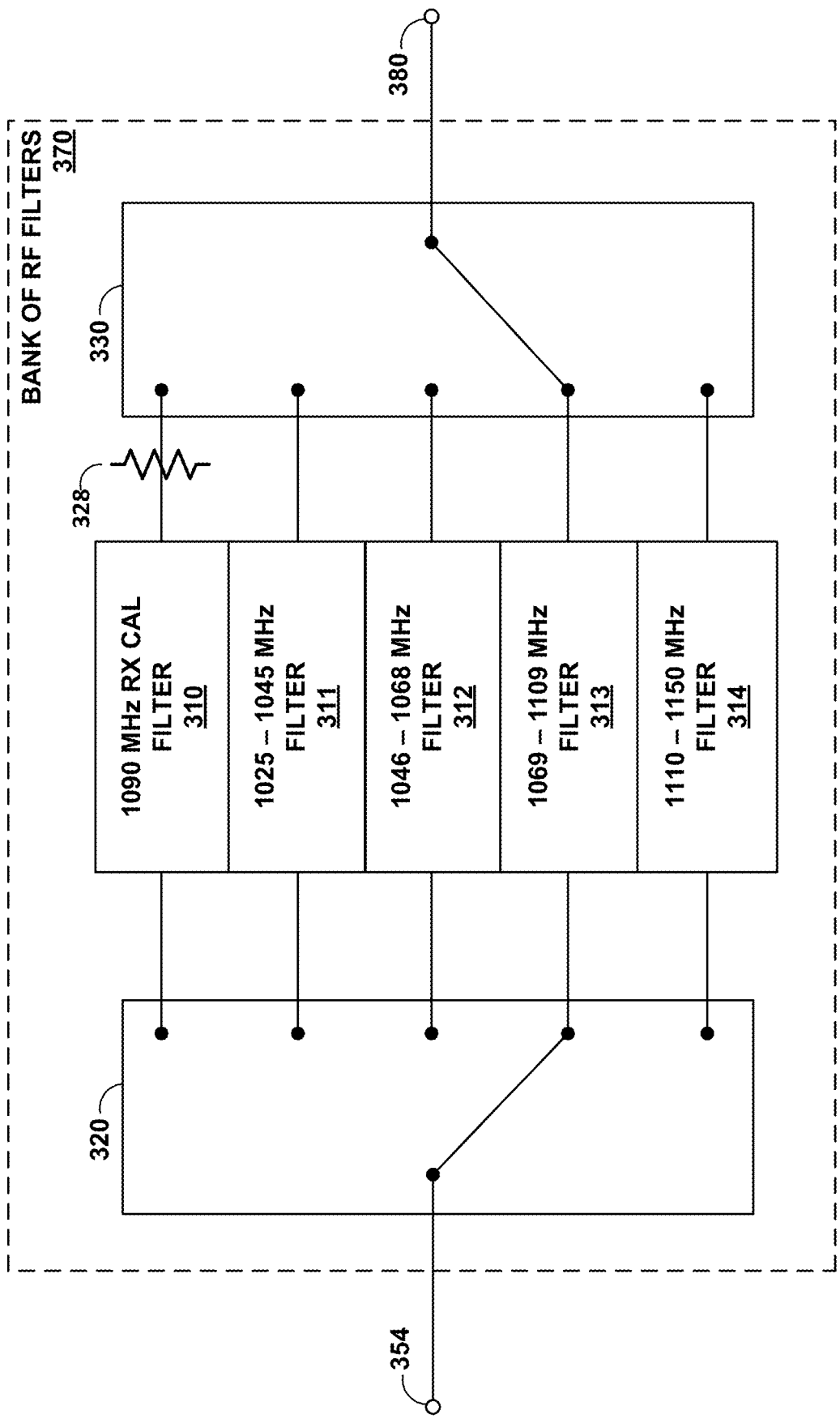
FIG. 3 is a conceptual block diagram of a bank of RF filters, in accordance with some examples of this disclosure.

FIG. 3 is a conceptual block diagram of a bank of RF filters 370, in accordance with some examples of this disclosure. Each of RF filters 310-314 may be connected in parallel between nodes 354 and 380 and between switches 320 and 330. Node 354 may be connected to a mixer that can up-convert IF signals to RF signals. Node 380 may be connected to a transmitter or an antenna configured to transmit RE signals. Resistor 328 represents an RF attenuator that may be used in the calibration channel to reduce the signal level so as to not saturate the receiver's analog processing and digitization circuitry.

In the example shown in FIG. 3, switch 320 may be configured to couple node 354 to one of filters 310-314. Switch 330 may be configured to couple node 380 to one of filters 310-314. Each of switches 320 and 330 may include a network of one or more transistors configured to activate or deactivate based on control signals from a controller (not shown in FIG. 3). The controller may be configured to cause both of switches 320 and 330 to connect nodes 354 and 380 to the same one of filters 310-314. As an alternative to bank of RF filters 370 shown in FIG. 3, a transmitter system may include a single bandpass filter having a passband that includes the passbands of all of filters 310-314.

In response to determining that the radar system will be sending an interrogation message, the controller may be configured to cause switch 320 to couple node 354 to filter 311 and to cause switch 330 to couple node 380 to filter 311 to allow the RF signals for the interrogation message to pass through RF titters 370. In response to determining that the radar system received an interrogation message, the controller may be configured to cause switch 320 to couple node 354 to filter 313 and to cause switch 330 to couple node 380 to filter 313 to allow the RF signals for a reply message to pass through RF filters 370.

In the example shown in FIG. 3, the passband of filter 311 includes the center frequency of traffic collision avoidance system (TCAS) interrogation messages, which is 1030 MHz. The passbands of filters 310 and 313 include the center frequency of transponder reply messages, which is 1090 MHz. The passbands shown in FIG. 3 are merely examples, and other frequency ranges are possible.

In some examples, bank of RF filters 370 may be used in a radar system capable of transmitting and receiving surveillance messages. Filter 310 may be used for receiving transponder reply messages at 1090 MHz. After transmitting an interrogation message, the controller may be configured to cause switch 320 to couple node 354 to filter 310 and to cause switch 330 to couple node 380 to filter 310 to allow received RF signals to pass through bank of RF filters 370.

Filters 310-314 may be relatively inexpensive because the lowest Nyquist region is removed from the RF signals received at node 354 by RF filters 370 and/or by an IF filter not shown in FIG. 3. As a result, filters 310-314 may have less steep rejection ratios, as compared to the filters in another system that encodes messages in the lowest Nyquist region.

Figure 4A:
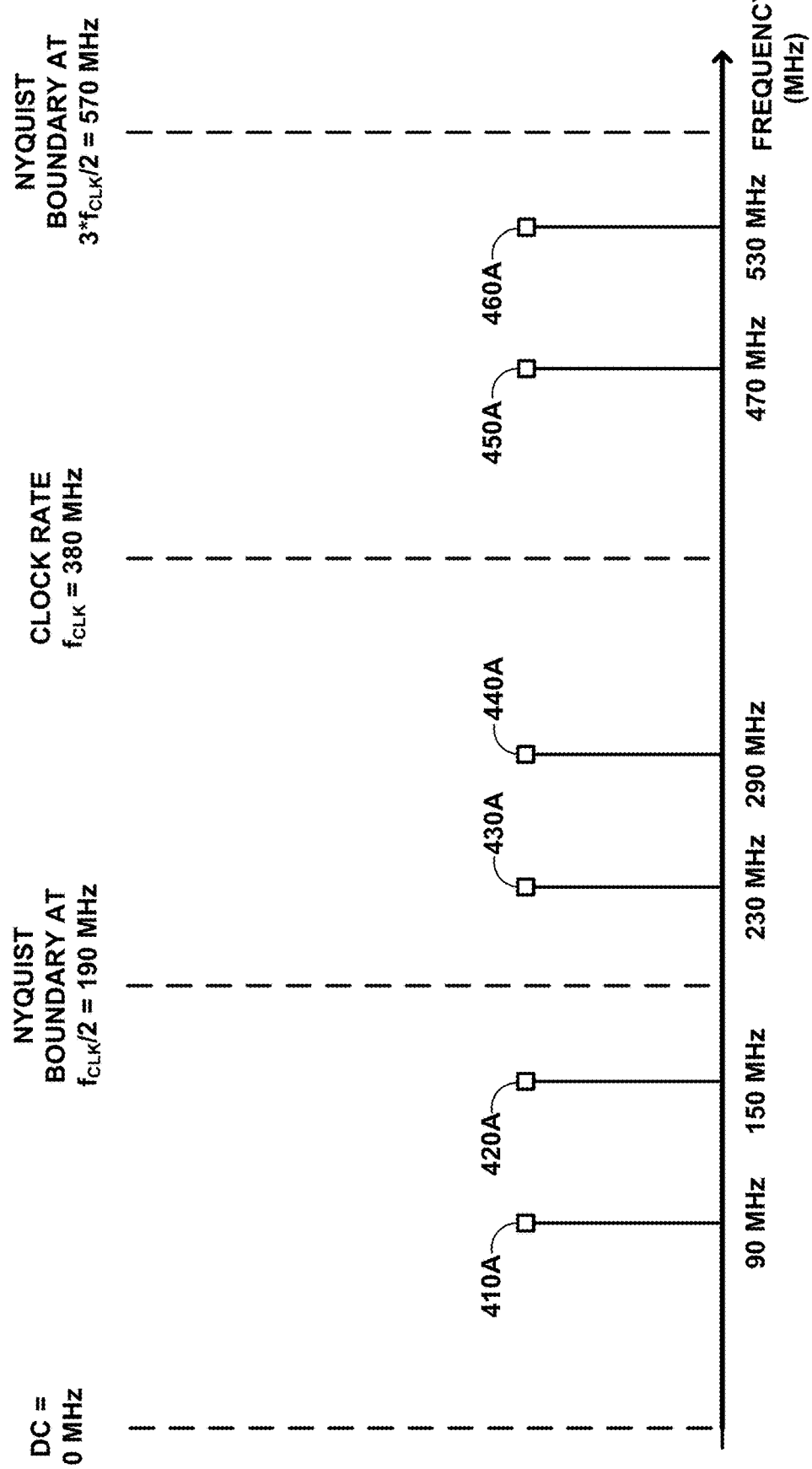
FIG. 4A is a diagram of an example frequency spectrum for intermediate-frequency signals and a clock rate, in accordance with some examples of this disclosure.

FIG. 4A is a diagram of an example frequency spectrum for IF signals and a clock rate, in accordance with some examples of this disclosure. In the example shown in FIG. 4A, the clock rate for a DAC is set to 380 megahertz. Therefore, the lowest Nyquist region (e.g., the first Nyquist region) extends from zero to 190 megahertz including the frequencies of signals 410A and 420A. The second Nyquist region extends from 190 megahertz to 380 megahertz including the frequencies of signals 430A and 440A. The third Nyquist region extends from 380 megahertz to 570 megahertz including the frequencies of signals 450A and 460A.

Converting a digital signal to an analog signal can create images in higher Nyquist regions. In examples in which the digital signal encodes data at ninety megahertz and the clock rate of the DAC is 380 megahertz, converting the digital signal to an analog signal may result in the same data being encoded at 290 megahertz, at 470 megahertz, and so on. In this example, the Nyquist boundaries are at 190 megahertz, 380 megahertz, 570 megahertz, and 760 megahertz.

Figure 4B:
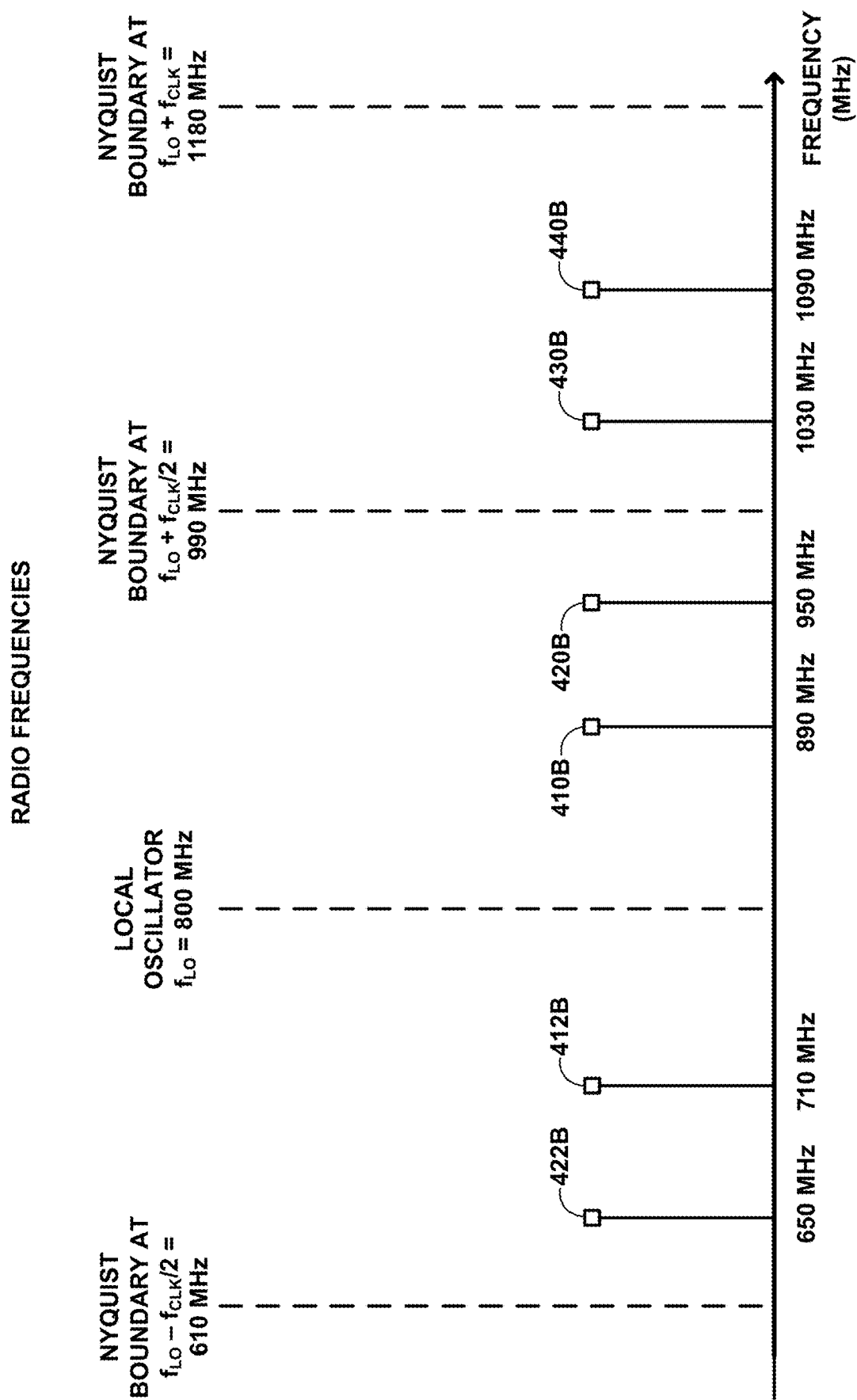
FIG. 4B is a diagram of an example frequency spectrum for RF signals and a local oscillator signal, in accordance with some examples of this disclosure.

Although the signals shown in FIGS. 4A and 4B are depicted as each including a single frequency, each signal may encode data within a frequency band with nonzero width. In some examples, the width of the frequency band of each signal may be approximately six megahertz or approximately one megahertz, centered on the frequency shown in FIG. 4A or in FIG. 4B.

Processing circuitry in a transmitter system may be configured to encode a first surveillance message (e.g., a TCAS interrogation message) in a digital signal in a frequency band centered on 150 megahertz. When the DAC converts the digital signal to an analog signal, the analog signal includes signal 420A in a frequency band centered on 150 megahertz. The analog signal may also include signals 430A and 460A, which are images of the data encoded in signal 420A in higher Nyquist regions. Additional images exist in even higher Nyquist regions (e.g., fourth, fifth, etc.). Equations (2) and (3) show the relationship between the frequencies of signals 420A, 430A, and 460A and the clock rate.

$$f_{430A}=250\text{MhZ}=f_{CLK}-f_{420A}=380\text{Mhz}-150\text{Mhz} \quad (2)$$

$$f_{460A}=530\text{Mhz}=f_{CLK}+f_{420A}=380\text{Mhz}+150\text{Mhz} \quad (3)$$

Processing circuitry in a transmitter system may be configured to encode a second surveillance message (e.g., a transponder reply message) in a digital signal in a frequency band centered on ninety megahertz. When the DAC converts the digital signal to an analog signal, the analog signal includes signal 410A in a frequency band centered on ninety megahertz. The analog signal may also include signals 440A and 450A, which are images of the data encoded in signal 410A in higher Nyquist regions. Equations (4) and (5) show the relationship between the frequencies of signals 410A, 440A, and 450A and the clock rate.

$$f_{440A}=290\text{Mhz}=f_{CLK}-f_{410A}=380\text{Mhz}-90\text{Mhz} \quad (4)$$

$$f_{450A}=470\text{Mhz}=f_{CLK}+f_{410A}=380\text{Mhz}-90\text{Mhz} \quad (5)$$

A transmitter system may include an IF filter configured to remove the frequency components in the lowest Nyquist region (e.g., frequencies less than 190 megahertz). For example, the IF filter may be configured to filter out frequencies less than one-half of the clock rate of the DAC. Filtering out the lowest Nyquist region may require less expensive and less complex circuitry than a transmitter system that uses the lowest Nyquist region and filters out the LO frequency and the higher Nyquist regions after up-conversion.

FIG. 4B is a diagram of an example frequency spectrum for RF signals and a local oscillator signal, in accordance with some examples of this disclosure. In the example shown in FIG. 4B, the frequency of the local oscillator signal is eight hundred megahertz. Therefore, a lowest Nyquist region below the local oscillator frequency extends from 610 MHz to eight hundred megahertz including the frequencies of signals 412B and 422B. A lowest Nyquist region above the LO frequency extends from eight hundred megahertz to 990 megahertz including the frequencies of signals 410B and 420B. A second Nyquist region above the LO frequency extends from 990 megahertz to 1180 megahertz including the frequencies of signals 430B and 440B.

Up-converting signal 410A using an LO frequency of eight hundred megahertz creates RF signals 410B, 412B, and 440B at 890 megahertz, 710 megahertz, and 1090 megahertz, respectively. RF signals 410B, 412B, and 440B may all be part of a single signal, but signal 410B represents a first frequency component, signal 412B represents a second frequency component, and signal 440B represents a third frequency component. RF signals 410B and 412B have frequencies that are equal to the sum and difference, respectively, of the LO frequency and the frequency of signal 410A, RF signal 440B has a frequency equal to the sum of the LO frequency and the clock rate, minus the frequency of signal 410A, Equations (6)-(8) show the relationship between the frequencies of signals 410B, 412B, and 440B, the LO frequency, and the clock rate.

$$f_{410B}=890\text{Mhz}=f_{LO}+f_{410A}=800\text{Mhz}+90\text{Mhz} \quad (6)$$

$$f_{412B}=710\text{Mhz}=f_{LO}+f_{410A}=800\text{Mhz}+90\text{Mhz} \quad (7)$$

$$f_{440B}=1090\text{Mhz}=f_{LO}+f_{CLK}-f_{410A}=800\text{Mhz}+380\text{Mhz}-90\text{Mhz} \quad (8)$$

Up-converting signal 420A using au LO frequency of eight hundred megahertz creates RF signals 420B, 422B, and 430B at 950 megahertz, 650 megahertz, and 1030 megahertz, respectively. RF signals 420B and 422B have frequencies that are equal to the sum and difference, respectively, of the LO frequency and the frequency of signal 420A. RF signal 430B has a frequency equal to the sum of the LO frequency and the clock rate, minus the frequency of signal 420A. Equations (9)-(11) show the relationship between the frequencies of signals 420B, 422B, and 430B, the LO frequency, and the clock rate.

$$f_{420B}=950\text{Mhz}=f_{LO}+f_{420A}=800\text{Mhz}+150\text{Mhz} \quad (9)$$

$$f_{422B}=650\text{Mhz}=f_{LO}-f_{420A}=800\text{Mhz}-150\text{Mhz} \quad (10)$$

$$f_{430B}=1030\text{Mhz}=f_{LO}+f_{CLK}-f_{420A}=800\text{Mhz}+380\text{Mhz}-150\text{Mhz} \quad (11)$$

An example transmitter system may be configured to transmit TCAS interrogation messages in a frequency band centered on 1030 megahertz and transponder reply messages in a frequency band centered on 1090 megahertz. This transmitter system may be configured to filter out the lowest Nyquist region(s), either before or after up-conversion. For example, an IF filter may be configured to filter the IF signals to remove the lowest Nyquist region after the digital-to-analog conversion and before up-conversion, such that the frequency components of signals 410B, 412B, 420B, and 422B are not present in the RF signals. The IF filter may be configured to remove frequencies less than one-half of the clock rate of the DAC. In such a system, an RF filter could remove the LO frequency of eight hundred megahertz that leaks into the RF signals.

Additionally or alternatively, a transmitter system may include an RF filter after up-conversion to remove the lowest Nyquist regions (e.g., frequencies in a range between 610 megahertz and 990 megahertz). The RF filter may be configured to remove frequencies greater than a difference between a frequency of the LO signal and one-half of the clock rate and less than a sum of a frequency of the LO signal and one-half of the clock rate. In other words, the RF filter may be configured to remove frequencies in a range between (i) as a lower bound, the frequency of the LO signal minus one-half of the clock rate and (ii) as an upper bound, a frequency of the LO signal plus one-half of the clock rate. This RF filter could be configured to also remove the LO frequency that leaks into the RF signals. The RF filter may include a bank of filters with the passbands shown in FIG. 3 and/or a high-pass filter with a cutoff frequency of approximately one gigahertz.

Figure 5:
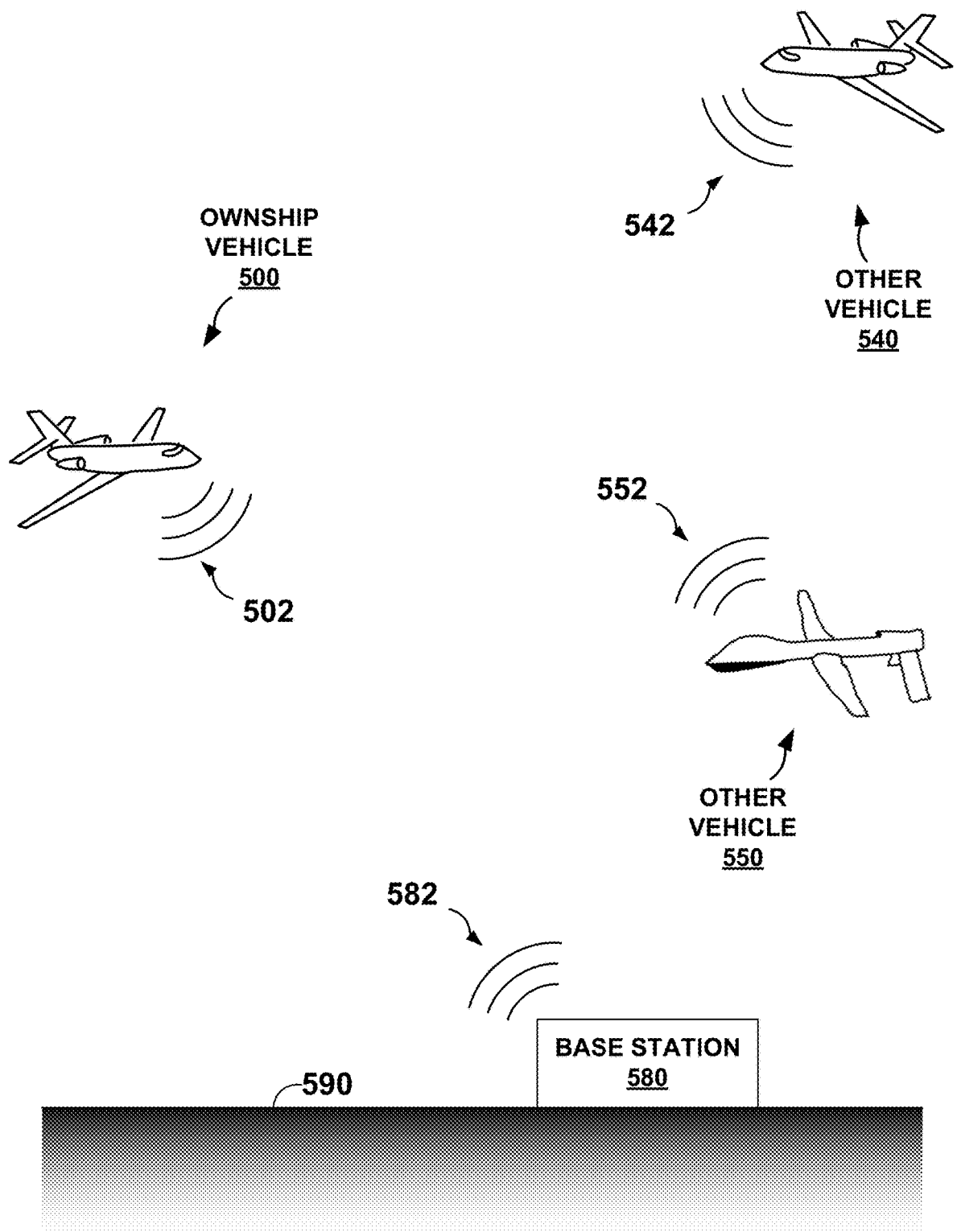
FIG. 5 is a conceptual block diagram of vehicles and a base station sending and receiving surveillance messages, in accordance with some examples of this disclosure.

FIG. 5 is a conceptual block diagram of vehicles 500, 540, and 550 and a base station 580 sending and receiving surveillance messages 502, 542, 552, and 582, in accordance with some examples of this disclosure. Vehicle 500 is referred to as the "ownship vehicle," because FIG. 5 is described from the perspective of a system of this disclosure mounted onboard vehicle 500. Although vehicles 500, 540, and 550 are depicted in FIG. 5 as aircraft, vehicles 500, 540, and 550 can be any other vehicle or non-vehicle mobile object.

In some examples, vehicles 500, 540, and 550 may include large commercial aircraft that may be equipped with a suite of sensors, communication equipment, a flight management system, and other equipment. Some examples of airborne sensors that may be aboard vehicles 500, 540, and 550, or other airborne platforms may include radar such as weather radar, ground avoidance radar, radar altimeter, and other active sensors. Passive sensors may include thermometer, pressure sensors, optical sensors such as cameras, including infrared cameras, and similar passive sensors. In some examples, aircraft may be equipped for TCAS interrogations and transponder replies, which may provide traffic and collision avoidance information. Vehicles 500, 540, and 550 may communicate with each other and with a traffic controller via voice radio or a text-based systems.

Base station 580 can be any entity on the ground that transmits and/or receives surveillance messages, Base station 580 can also be a marine or an airborne entity. Base station 580 may aggregate and distribute position and velocity data for vehicles 500, 540, and 550. In some examples, base station 580 may be part of a network of base stations that communicate with vehicles 500, 540, and 550 as well as traffic control systems, weather centers, and other entities.

Each of vehicles 500, 560, and 570 can determine its location and speed using systems onboard the vehicle. Each of vehicles 500, 540, and 550 may include a Global Navigation Satellite System, an inertial navigation system for determining a turn rate, velocity, and acceleration for the respective vehicle 500, 540, or 550, Each of vehicles 500, 540, and 550 may include an altimeter, an accelerometer, an attitude and heading reference system, and/or other sensors and means for determining altitude, velocity, and other parameters of the respective vehicle 500, 540, or 550.

Vehicles 500, 540, and 550 can transmit surveillance messages 502, 542, and 552 indicating the locations and speeds of vehicles 500, 540, and 550. Surveillance messages 502, 542, and 552 may be periodic, unprompted broadcasts and/or replies to interrogation messages received from vehicles 500, 540, and 550 and/or base station 580. In some examples, vehicle 500 may include a transmitter system similar to system 100 shown in FIG. 1 or system 200 shown in FIG. 2. In examples in which vehicle 500 receives an interrogation message while transmitting another surveillance message, the transmitter system may be able to quickly transition from the first transmission to transmitting a reply message. This quick transition may allow for compliance with a time limit on transmitting a reply message after receiving an interrogation message, which may be required by industry standards or government regulations.

Figure 6:
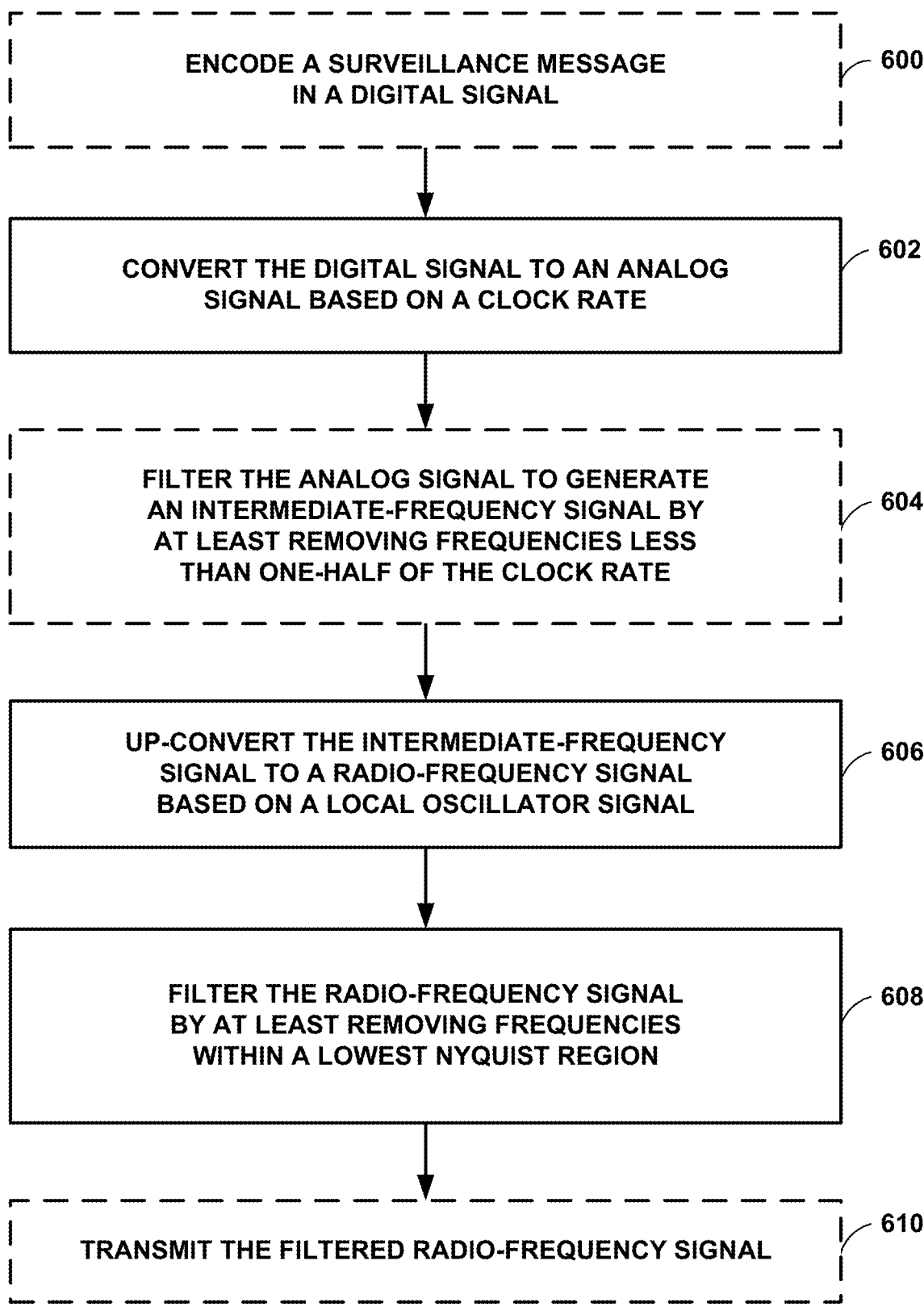
FIG. 6 is a flowchart illustrating an example process for filtering signals in a transmitter system, in accordance with some examples of this disclosure.

FIG. 6 is a flowchart illustrating an example process for filtering signals in a transmitter system, in accordance with some examples of this disclosure. The example process of FIG. 6 is described with reference to transmitter system 200 shown in FIG. 2, although other components may exemplify similar techniques. Operations 600, 604, and 610 are optional steps that may not be performed in all examples.

In the example of FIG. 6, processing circuitry 210 encodes a surveillance message in a digital signal (600). Processing circuitry 210 can modulate the digital signal to encode the data of the surveillance message in a first frequency hand that is less than one-half of clock rate 232 (e.g., in the lowest Nyquist region). DAC 230 converts the digital signal to an analog signal based on clock rate 232 (602). The analog signal outputted by DAC 230 may encode the data of the surveillance message at the frequencies within the first frequency band in the lowest Nyquist region. The analog signal may also encode the data at one or more image frequencies in higher Nyquist regions.

Bandpass filter 240 filters the analog signal to generate an IF signal by at least removing frequencies less than one-half of clock rate 232 (604). For example, bandpass filter 240 may have a passband that includes the second Nyquist region that extends from one-half of clock rate 232 to clock rate 232. Mixer 250 up-converts the IF signal to an RF signal based on local oscillator signal 252 (606). Mixer 250 may be configured to generate a first signal at a frequency equal to a sum of local oscillator signal 252 and the IF signal and generate a second signal at a frequency equal to a difference of local oscillator signal 252 and the IF signal. By using the second Nyquist region to encode the data of a surveillance message, the gap between the frequencies of the first and/or second signals and the LO frequency may be relatively large, allowing for easier filtering by RF filter 270.

RF filter 270 filters the RF signal by at least removing frequencies within a lowest Nyquist region (608). The lowest Nyquist region may include frequencies that are within one-half of clock rate 232 of the frequency of LO signal 252. In other words, the lowest Nyquist region may include frequencies in a range between, as a lower bound, the frequency of LO signal 252 minus one-half of clock rate 232 and, as an upper bound, a sum of the frequency of LO signal 252 and one-half of clock rate 232.

In examples in which local oscillator signal 252 has a lower frequency than the transmission frequency, RF filter 270 may be configured to remote frequencies less than a sum of a frequency of local oscillator signal 252 and one-half of clock rate 232. In examples in which local oscillator signal 252 has a higher frequency than the transmission frequency, RF filter 270 may be configured to remove frequencies more than a difference between a frequency of LO signal 252 and one-half of clock rate 232. Antenna 290 then transmits the filtered RF signals received from RF filter 270 via node 280 (610).

The following numbered clauses illustrate one or more aspects of the devices and techniques described in this disclosure.

Clause 1. A system comprising: a digital-to-analog converter (DAC) configured to operate at a clock rate; a mixer configured to up-convert an intermediate-frequency (IF) signal from the DAC to a radio-frequency (RF) signal based on a local oscillator (LO) signal; and an RF filter configured to generate a filtered signal by at least removing, from the RF signal, frequency components greater than a difference between a frequency of the LO signal and one-half of the clock rate and less than a sum of a frequency of the LO signal and one-half of the clock rate, wherein an output node of the RF filter is configured to be coupled to an antenna for transmission of the filtered signal.

Clause 2. The system of clause 1, further comprising a bandpass filter coupled between the DAC and the mixer.

Clause 3. The system of clause 2, wherein the filtered signal is a second filtered signal, wherein the bandpass filter is configured to generate a first filtered signal by at least removing, from an analog signal generated by the DAC, frequencies less than one-half of the clock rate, and wherein the mixer is configured to up-convert the first filtered signal to the RF signal based on the LO signal.

Clause 4. The system of any of clauses 1-3, further comprising a fixed-frequency LO circuit configured to generate the LO signal.

Clause 5. The system of any of clauses 1-4, wherein the RF filter comprises a plurality of individual filters connected in parallel.

Clause 6. The system of clause 5, wherein a passband of a first bandpass filter of the plurality of individual filters includes 1,030 megahertz, and wherein a passband of a second bandpass filter of the plurality of individual filters includes 1,090 megahertz.

Clause 7. The system of any of clauses 1-6, wherein the surveillance message comprises a reply message, and wherein the processing circuitry is configured to encode the reply message in response to determining that the system received an interrogation message.

Clause 8. The system of any of clauses 1-7, further comprising processing circuitry configured to encode a surveillance message in a digital signal, wherein the DAC is configured to generate the IF signal by converting the digital signal to an analog signal.

Clause 9. The system of clause 8, wherein the processing circuitry is configured to encode the surveillance message in the digital signal within a first frequency band, and wherein the first frequency band falls within a lowest Nyquist region bounded by one-half of the clock rate.

Clause 10. The system of clause 8, wherein the processing circuitry is configured to encode the surveillance message in the digital signal within a first frequency band, and wherein the clock rate is greater than two times than an upper bound of the first frequency band.

Clause 11. The system of any of clauses 1-10, wherein the DAC is configured to boost a power level of analog signals at frequencies between one-half of the clock rate and the clock rate.

Clause 12. A method comprising: converting, by a digital-to-analog converter (DAC) based on a clock rate, a digital signal to an analog signal; up-converting, by a mixer based on a local oscillator (LO) signal, an intermediate-frequency (IF) signal from the DAC to a radio-frequency (RF) signal; filtering the RF signal by at least removing, from the RF signal, frequency components greater than a difference between a frequency of the LO signal and one-half of the clock rate and less than a sum of a frequency of the LO signal and one-half of the clock rate; and transmitting the filtered RF signal.

Clause 13. The method of clause 12, further comprising filtering the analog signal to generate the IF signal by at least removing, from the analog signal, frequencies less than one-half of a clock rate of the DAC.

Clause 14. The method of clause 12 or 13, further comprising generating, by a fixed-frequency LO circuit, the LO signal.

Clause 15. The method of any of clauses 12-14, wherein filtering the RF signal comprises: filtering, by a first bandpass filter, the RF signal, wherein a passband of the first bandpass filter includes 1,030 megahertz; and filtering, by a second bandpass filter connected in parallel with the first bandpass filter, the RF signal, wherein a passband of the second bandpass filter includes 1,090 megahertz.

Clause 16. The method of any of clauses 12-15, further comprising encoding a reply message in the digital signal in response to determining an interrogation message was received by a system including the DAC and the mixer.

Clause 17. The method of clause 16, further comprising encoding a surveillance message in the digital signal within a first frequency band, wherein the first frequency band falls within a lowest Nyquist region bounded by one-half of the clock rate.

Clause 18. A system comprising: a field-programmable gate array (FPGA) configured to encode a surveillance message in a digital signal; a digital-to-analog converter (DAC) configured to convert the digital signal to an analog signal based on a clock rate; a bandpass filter configured to remove, from the analog signal, frequencies less than one-half of the clock rate to generate an intermediate-frequency (IF) signal; a fixed-frequency local oscillator (LO) circuit configured to generate an LO signal; a mixer configured to up-convert the IF signal to a radio-frequency (RF) signal based on the LO signal; a RF filter configured to generate a filtered signal by at least removing, from the RF signal, frequency components greater than a difference between a frequency of the LO signal and one-half of the clock rate and less than a sum of a frequency of the LO signal and one-half of the clock rate.

Clause 19. The system of clause 18, wherein the FPGA is configured to encode the surveillance message in the digital signal within a first frequency band, wherein the first frequency band falls within a lowest Nyquist region bounded by one-half of the clock rate, and wherein the clock rate is greater than two times than an upper bound of the first frequency band.

Clause 20. The system of clause 18 or 19, wherein the DAC is configured to boost a power level of analog signals at frequencies between one-half of the clock rate and the clock rate.

This disclosure has attributed functionality to processing circuitry 110 and 210. Processing circuitry 110 and 210 may include one or more processors. Processing circuitry 110 and 210 may include any combination of integrated circuitry, discrete logic circuitry, analog circuitry. In some examples, processing circuitry 110 and 210 may include multiple components, such as any combination of one or more microprocessors, one or more DSPs, one or more ASICs, or one or more FPGAs (e.g., a XC7A series device made by Xilinx, Inc. of San Jose, California), as well as other discrete or integrated logic circuitry, and/or analog circuitry. The techniques described in this disclosure may also be encoded in a non-transitory computer-readable storage medium, such as a memory coupled to processing circuitry 110 and 210. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A system comprising:
  a digital-to-analog converter (DAC) configured to operate at a clock rate (fs) to convert a digital signal to an analog signal, wherein the analog signal comprises analog signal content from signal images in more than one Nyquist region;

a bandpass filter configured to remove a first portion of the analog signal content that is in a lowest Nyquist region of the analog signal, to generate an intermediate-frequency (IF) signal comprising IF signal content that is in Nyquist regions above the lowest Nyquist region, wherein the lowest Nyquist region comprises frequencies between zero and one-half of fs;

a mixer configured to up-convert the IF signal from an output of the bandpass filter to a radio-frequency (RF) signal based on a local oscillator (LO) signal;

a LO circuit configured to generate the LO signal; and an RF filter configured to generate a filtered signal by at least removing, from the RF signal, first RF signal content that is in a first frequency range that is greater than a difference between a frequency of the LO signal and one-half of fs and less than a sum of the frequency of the LO signal and one-half of fs, resulting in a filtered RF signal, wherein the filtered RF signal comprises second RF signal content in a second frequency range that is greater than the sum of the frequency of the LO signal and one-half of fs, and wherein an output node of the RF filter is configured to be coupled to an antenna for transmission of the RF filtered signal.

2. The system of claim 1, wherein the bandpass filter is coupled between the DAC and the mixer.

3. The system of claim 2,
wherein the filtered signal is a second filtered signal,
wherein the bandpass filter is configured to generate a first filtered signal by at least removing, from the analog signal generated by the DAC, a third portion of the analog signal content that is in frequencies less than one-half of fs, and
wherein the mixer is configured to up-convert the first filtered signal to the RF signal based on the LO signal.

4. The system of claim 1, further comprising a fixed-frequency LO circuit configured to generate the LO signal.

5. The system of claim 1, wherein the RF filter comprises a plurality of individual filters connected in parallel.

6. The system of claim 5,
wherein a passband of a first bandpass filter of the plurality of individual filters includes 1,030 megahertz, and
wherein a passband of a second bandpass filter of the plurality of individual filters includes 1,090 megahertz.

7. The system of claim 1, further comprising processing circuitry configured to encode a surveillance message in the digital signal,
wherein the DAC is configured to generate the IF signal by converting the digital signal to the analog signal.

8. The system of claim 7,
wherein the processing circuitry is configured to encode the surveillance message in the digital signal within a first frequency band, and
wherein the first frequency band falls within a second Nyquist region, and wherein the second Nyquist region is bounded between one-half of fs and fs.

9. The system of claim 7,
wherein the processing circuitry is configured to encode the surveillance message in the digital signal within a first frequency band, and
wherein fs is no greater than two times a lower frequency bound of the first frequency band.

10. The system of claim 7, wherein the DAC is configured to boost a power level of analog signals at frequencies between one-half of fs and fs.

11. The system of claim 7,
wherein the surveillance message comprises a reply message, and
wherein the processing circuitry is configured to encode the reply message in response to determining that the system received an interrogation message.

12. A method comprising:
converting, by a digital-to-analog converter (DAC) based on a clock rate (fs), a digital signal to an analog signal comprising analog signal content from signal images in more than one Nyquist region;

filtering out, by a bandpass filter, a first portion of the analog signal content that is within a lowest Nyquist region to generate an intermediate-frequency (IF) signal comprising IF signal content that is in Nyquist regions above the lowest Nyquist region, wherein the lowest Nyquist region comprises frequencies between zero and one-half of fs;

up-converting, by a mixer based on a local oscillator (LO) signal, the IF signal from an output of the DAC to a radio-frequency (RF) signal;

generating the LO signal with an LO circuit;

filtering the RF signal by at least removing, from the RF signal, first RF signal content that is in a first frequency range that is greater than a difference between a frequency of the LO signal and one-half of fs and less than a sum of the frequency of the LO signal and one-half of fs, resulting in a filtered RF signal, wherein the filtered RF signal comprises second RF signal content in a second frequency range that is greater than the sum of the frequency of the LO signal and one-half of fs; and transmitting the filtered RF signal.

13. The method of claim 12, further comprising generating, by a fixed-frequency LO circuit, the LO signal.

14. The method of claim 12, wherein filtering the RF signal comprises:
filtering, by a first bandpass filter, the RF signal, wherein a passband of the first bandpass filter includes 1,030 megahertz; and
filtering, by a second bandpass filter connected in parallel with the first bandpass filter, the RF signal, wherein a passband of the second bandpass filter includes 1,090 megahertz.

15. The method of claim 12, further comprising encoding a reply message in the digital signal in response to determining an interrogation message was received by a system including the DAC and the mixer.

16. The method of claim 15, further comprising encoding a surveillance message in the digital signal within a first frequency band,
wherein the first frequency band falls within a second Nyquist region, and wherein the second Nyquist region is bounded between one-half of fs and fs.

17. A system comprising:
a field-programmable gate array (FPGA) configured to encode a surveillance message in a digital signal;
a digital-to-analog converter (DAC) configured to convert the digital signal to an analog signal, comprising analog signal content from signal images in more than one Nyquist region, based on a clock rate (fs);
a bandpass filter configured to remove, analog signal content in a lowest Nyquist region from the analog signal to generate an intermediate-frequency (IF) signal, wherein the lowest Nyquist region comprises frequencies between zero and one-half of fs;

a local oscillator (LO) circuit configured to generate an LO signal;

a mixer configured to up-convert the IF signal to a radio-frequency (RF) signal based on the LO signal;

a LO circuit configured to generate the LO signal; and a RF filter configured to generate a filtered signal by at least removing, from the RF signal, first RF signal content that is in a first frequency range that is greater than a difference between a frequency of the LO signal and one-half of fs and less than a sum of the frequency of the LO signal and one-half of fs, resulting in a filtered RF signal, wherein the RF filtered signal comprises second RF signal content in a second frequency range that is greater than the sum of the frequency of the LO signal and one-half of fs.

18. The system of claim 17, wherein the FPGA is configured to encode the surveillance message in the digital signal within a first frequency band, wherein the first frequency band falls within a second Nyquist region, and wherein the second Nyquist region is bounded between one-half of fs and fs, and wherein fs is no greater than two times a lower frequency bound of the first frequency band.

19. The system of claim 17, wherein the DAC is configured to boost a power level of analog signals at frequencies between one-half of fs and fs.

* * * * *